ATTORNEY

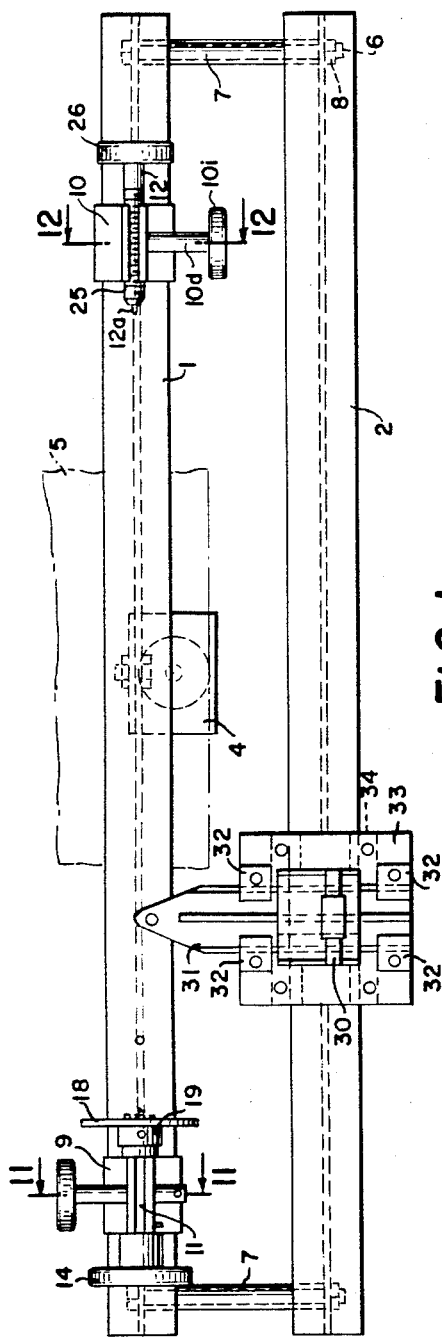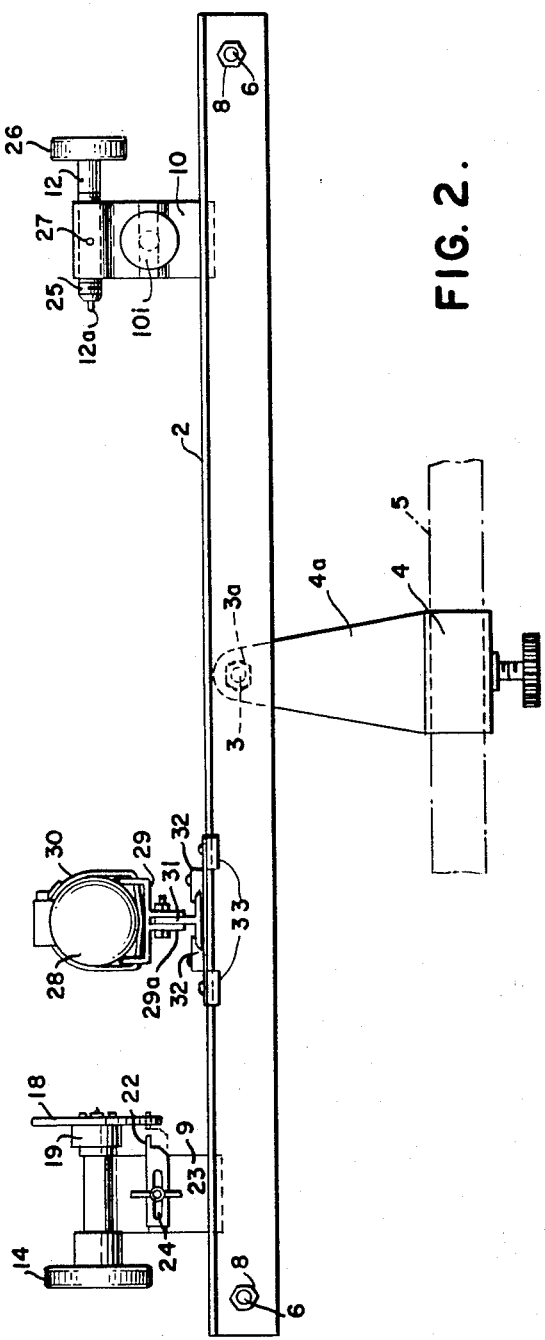

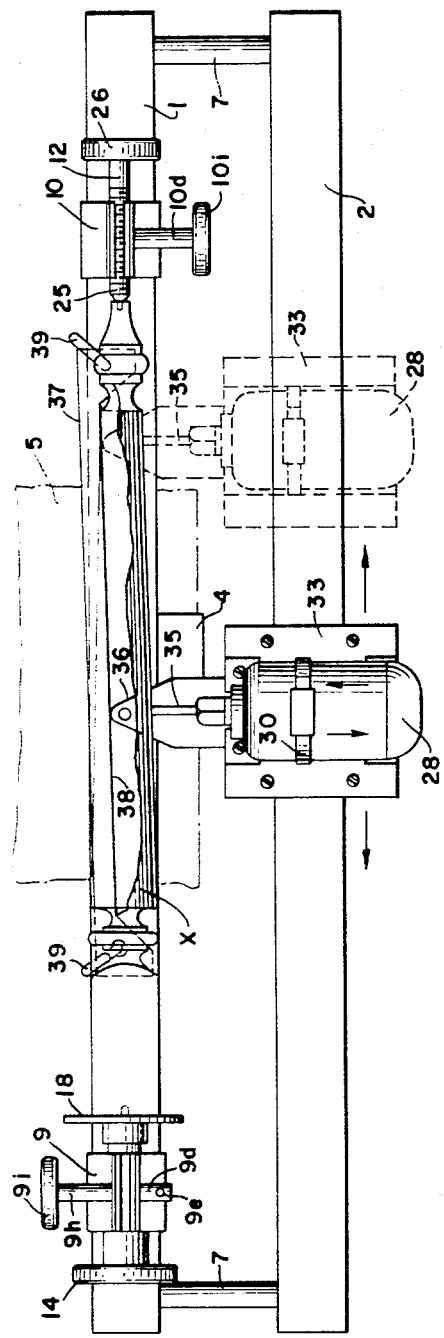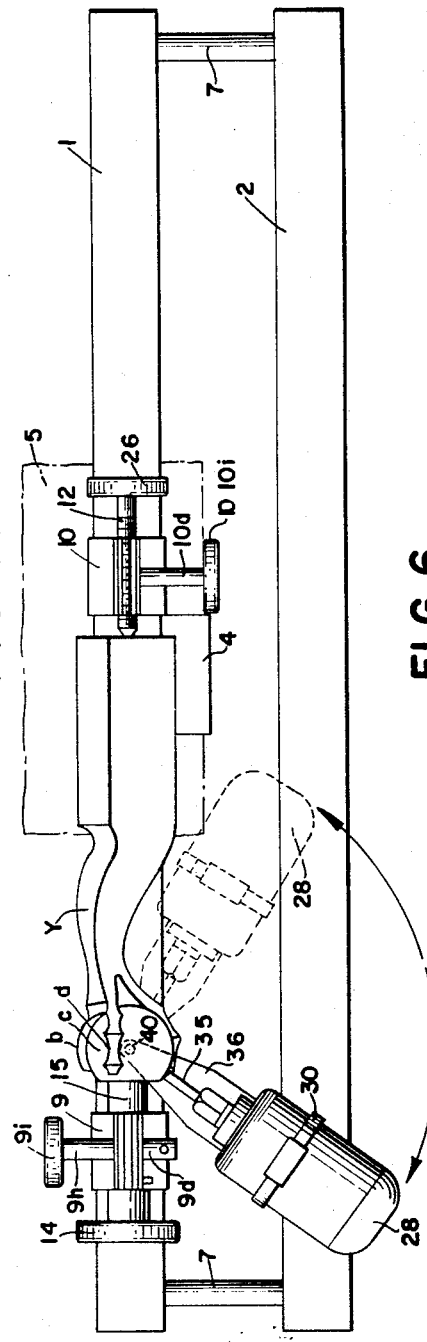

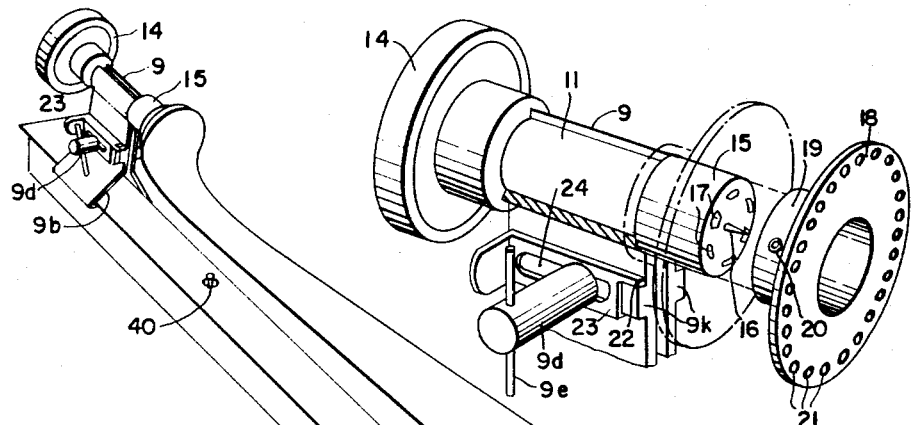
FIG.10.
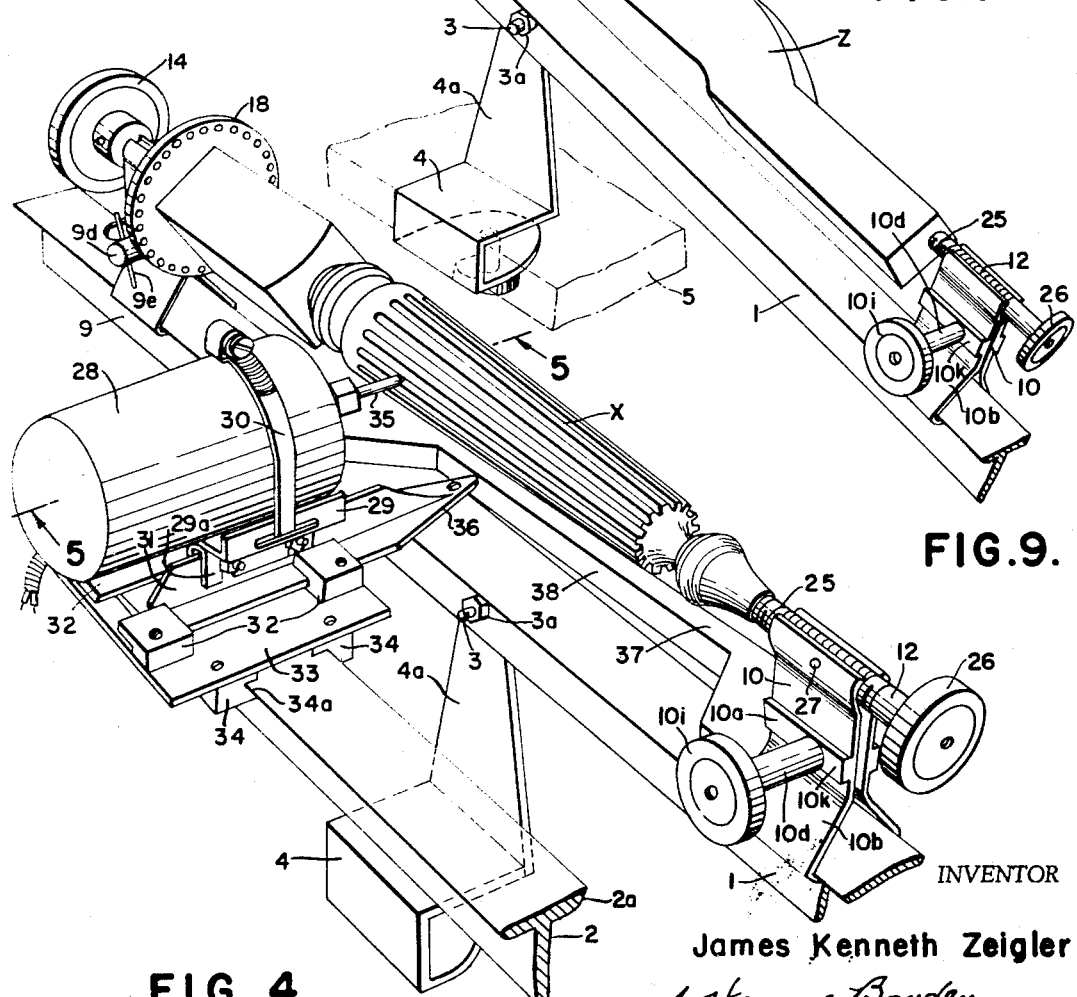
FIG.9.
FIG.4.
INVENTOR
James Kenneth Zeigler
BY J. Hanson Boyden
ATTORNEY INVENTOR
James Kenneth Zeigler BY *J. Hanson Boyden*,

INVENTOR
James Kenneth Zeigler
BY J. Hanson Boyden,
ATTORNEY and illustrated in the accompanying drawings, forming part of this specification, and in which:

FIG. 1 is a plan view of one form of the invention;

FIG. 2 is a side elevation thereof;

FIG. 3 is a plan view similar to FIG. 1, but showing a workpiece in position on the holder, and illustrating the power tool in different positions;

FIG. 4 is a perspective view showing the same workpiece as in FIG. 3, and also illustrating more clearly the guide pattern for controlling the tool;

FIG. 6 is a plan view similar to FIGS. 1 and 3, but showing the power tool mounted to operate on a different kind of workpiece;

FIG. 9 is a perspective view of a different form of the invention, embodying only a portion of the equipment illustrated in the preceding figures, namely, the workholder alone, without any means for supporting a power tool, and showing a third kind of workpiece in position on this holder;

FIG. 10 is a fragmentary perspective view of my improved headstock, showing the indexing means, and the means for non-rotatively engaging one end of the workpiece;

Figure 5:
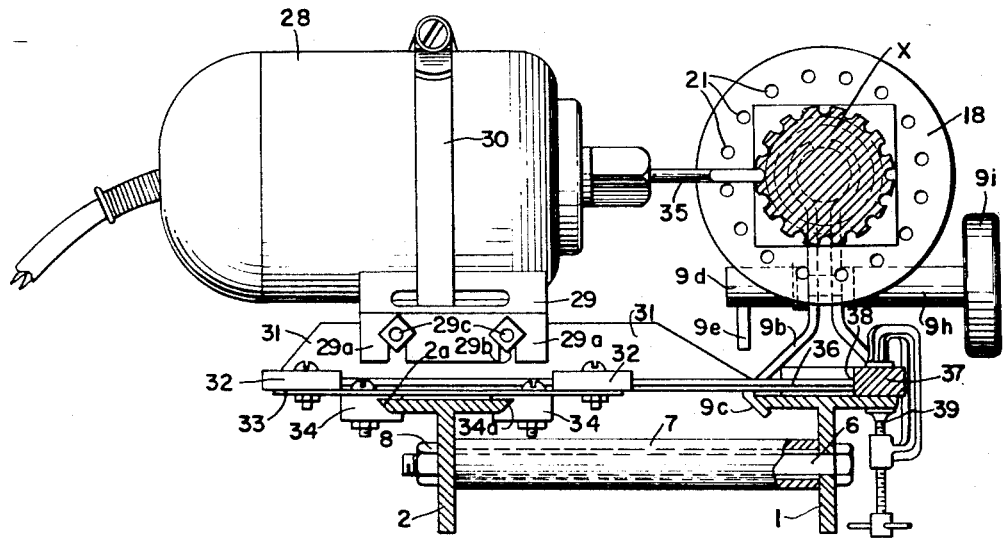
FIG. 5 is a transverse section substantially on the line 5—5 of FIG. 4, looking in the direction of the arrows.

Referring to the drawings in detail, and first more particularly to FIGS. 1 to 5, 10, 11 and 12, my improved equipment includes a frame or bed comprising a pair of bars 1 and 2, advantageously of T-shape in cross-section.

The bar 1 is supported near its middle on a pivot 3, carried at the upper end of a pedestal 4a, extending upwardly from a C-clamp 4, adapted to be clamped to a work bench or table 5. The two bars are held in parallel spaced relation and rigidly but detachably united at each end by a spacing sleeve 7 through which and the webs of the bars passes a bolt 6, secured by a nut 8. The upper surfaces of the flanges of the bars are flat and lie substantially in the same plane.

Thus the entire frame, comprising the two united bars, may be tilted about the pivot 3 to any desired convenient angle and may be frictionally held in the selected position by tightening the nut 3a on the pivot bolt 3.

For supporting an elongated workpiece by its ends, I mount on the bar 1 a headstock 9 and a tailstock 10. (I use the terms "headstock" and "tailstock" because of the general similarity of my workholder to a lathe. Unlike a lathe, however, the workpiece is not rotated by power, but, as will hereinafter appear, is only angularly adjustable by hand about its axis.)

The headstock 9, which is preferably formed of extruded aluminum, comprises a pair of separate jaws having spaced parallel portions 9a and flaring lower portions 9b. The extreme lower edge of the portion 9b extends inwardly at an angle as at 9c so as to engage around and under the beveled edges 1a of the flange of the bar 1, as best shown in FIG. 11.

Figure 11:
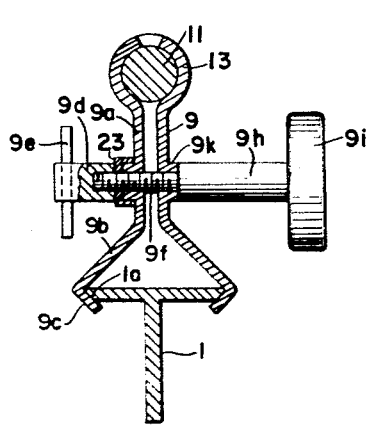
FIG. 11 is a transverse section on an enlarged scale through the headstock, on the line 11—11 of FIG. 1, looking in the direction of the arrows.
Figure 12:
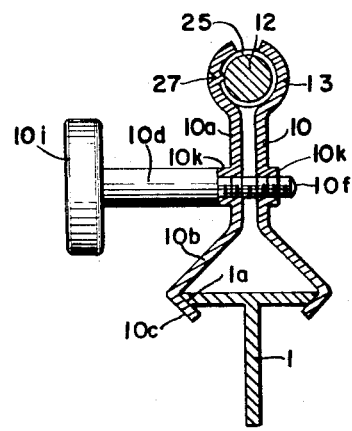
FIG. 12 is a similar section through the tailstock, on the line 12—12 of FIG. 1, looking in the direction of the arrows.

The parallel portions 9a are each formed with a longitudinally extending thickened rib 9k, and against this rib, on the left hand side, as viewed in FIG. 11, is a slide 23, best shown in FIG. 10, and hereinafter more particularly described. This slide has a longitudinal slot 24 through which extends the threaded end 9f of a clamping bolt 9h, having at its end a handwheel 9i, by which it may be turned. The threaded end 9f passes freely through a smooth hole in the rib 9k on the right-hand side, and engages a threaded opening in the rib 9k on the left-hand side. Thus, by turning up the handwheel 9i, the jaws may be forced together or tightened. Referring again to FIG. 11, it will be seen that the thread end 9f of the bolt projects well beyond the outer face of the slide 23. A cylindrical nut 9d, having at its end a transverse pin 9e, is provided with a threaded socket adapted to fit over and engage the projecting threaded end of the bolt 9f. Thus, by means of the nut 9d, the slide 23 may be clamped in any desired position independently of the handwheel 9i.

The upper ends of the jaws are of semicylindrical shape, as indicated at 13, and are adapted to frictionally grip between themselves the headstock shaft 11, carrying at its outer end a handwheel 14, and at its inner end a head 15 (FIG. 10), having projecting from its face a pointed "center" 16, and a plurality of teeth 17. These teeth, when the workpiece is put into the holder, bite into its end, and thus rigidly couple the workpiece to the shaft 11.

The headstock also preferably is provided with an indexing device. As best shown in FIG. 10, this comprises a disc 18, having a hub 19, fitting over the head 15, and adapted to be secured thereto by a set screw 20. The disc 18 has a circular series of equally spaced holes 21 around its outer perimeter. A pin or finger 22, formed on the above mentioned slide 23. carried by the portion 9a, is arranged to enter any desired one of this series of holes. The slide 23 has a longitudinal slot 24, as above described, working over the threaded bolt 9f, and may be adjusted as desired, and clamped in adjusted position by the head 9d, turned by the pin 9e.

The tailstock 10 (FIG. 12) likewise comprises a pair of extruded aluminum separate jaws having spaced parallel portions 10a and downwardly flaring portions 10b, the extreme ends of these flaring portions extending inwardly at an angle as at 10c, so as to engage around and under the beveled edges 1a of the flange of the bar 1.

Each of these jaws has a thickened rib or strip 10k extending longitudinally along the outside of the parallel portion 10a. A bolt 10d, having a threaded end 10f, passes freely through a smooth opening in one of the ribs 10k, and engages a registering threaded opening 10g in the other rib, the bolt having a handwheel 10i at its other end by which it may be turned.

The tailstock also has a shaft 12, threaded as indicated at 25, having a handwheel 26 at its outer end, and, as in the headstock, the upper ends 13 of the jaws are of semicylindrical form, so as to embrace the shaft 12. A punch mark 27 (FIG. 12) is made in one of these semicylindrical portions, so as to form a projection extending inwardly to engage the threads 25 of the shaft. (This is a satisfactory, low cost substitute for threading the interior of the jaws.) A pointed "center" 12a (FIG. 2) is formed at the inner end of the shaft 12, about which center the workpiece may freely turn.

It will now be understood that both the headstock and the tailstock can be shifted as desired along the length of the bar or bed 1. To shift them, the clamping bolts 9a or 10d are loosened, and this will permit the inclined portions 9c or 10c to slide freely over the beveled edges of the bar. When they have been adjusted to the desired position, they can be secured in such position by tightening the said clamping bolts. And it will be noted that when these bolts are tightened, they serve also to cause the semicylindrical portions 13 of the jaws to grip the shafts 11 or 12.

In the case of the tailstock, this gripping action causes the projection 27 to properly engage the threads 25, thus permitting a fine adjustment of the distance between the center 12a and the headstock by turning the handwheel 26.

In the case of the headstock, this gripping action serves to frictionally hold the shaft 11, and the workpiece impaled upon the teeth 17, in any angular position to which it is adjusted by turning handwheel 14. This frictional holding action may be made as strong as necessary by manipulating the clamping bolt 9h.

One use for my novel equipment is illustrated in FIGS. 3, 4 and 5. In these figures there is shown a table leg X which, after being turned on a lathe, it is desired to flute or reed. For this fluting I employ a power tool unit, in the nature of a router, comprising a motor 28, and a bit or cutter 35, of a well known type, so constructed as to cut at the sides, as well as the end. For reeding, I use a different shaped well known cutter. This power tool is mounted on a suitable base member 29, to which it is secured by means of a belt or band 30. The base also comprises a transversely extending member 31, advantageously of inverted T-section. The base member 29 has an inverted U-shaped portion 29a which straddles the upstanding web 31, and is formed on each side with a pair of downwardly extending slots 29b through which and the web 31 pass a pair of bolts 29c. The slots 29b permit the member 29 to be adjusted vertically relative to the member 31, as required for the workpiece. (See FIGS. 5 and 7.) Overlapping the flange of this T-shaped member are two pairs of spaced guide members 32, secured to the upper surface of a sub-base 33. This sub-base is supported substantially on the upper surface of the T-bar 2, and has a pair of slide members 34 secured to its under surface, one on each side of the T-bar, as best shown in FIG. 4. The side edges of the flange of the T-bar 2 are beveled as at 2a, and the slide members 34 are similarly beveled as at 34a.

From the foregoing, it will be understood that the power tool unit can be moved by hand both longitudinally of the bars 1, 2, and transversely thereof. The upper surfaces of these bars lie substantially in the same plane, the base member 31 of the tool extending across the space between the two bars.

The leg X is placed in the workholder as follows: The headstock and/or tailstock are first set approximately the desired distance apart by loosening the clamping bolt 9d or 10d, and sliding one or both stocks along the bar 1. After they have been shifted to the proper position, they are locked firmly in that position by tightening the clamping bolt or bolts. One end of the table leg is then impaled upon the center 16 and teeth 17 of the headstock. The screw shaft 25 of the tailstock is then turned up so as to force the center 12a into the other end of the leg. By turning the handwheel 14, the leg can then be rotated to any desired angular position, it being understood that the portion 13 of the jaws frictionally grip the shaft 11 to a sufficient extent to hold it in any position to which it is turned. By means of the indexing device 18, 22, 23, the leg may be turned through successive equal angles, and may be locked in each position.

To form flutes or reeds in the desired portion of the leg, the tool is first shifted laterally on its base member 31 toward the workpiece, until the bit or cutter has entered the workpiece to the desired depth, as best shown in FIG. 5, and then the tool is moved by hand longitudinally of the workpiece, as shown in dotted lines in FIG. 3, the sub-base 33 sliding on the bar 2, during such longitudinal movement. This movement of the tool will cut a flute or groove in the leg. The tool is then withdrawn and the leg turned to the next position, as determined by the indexing device, and the tool is moved to cut another flute or groove. This cycle is repeated until equally spaced grooves or reeds have been cut all around the leg, as shown in FIG. 4.

It will be noted that the surface of that part of the leg to be fluted is somewhat tapered, and not parallel with the bars 1 and 2. For this reason, and to ensure that the grooves are cut to a uniform depth throughout their length, I use a template or pattern 37. This is supported on the bar 1, and may be secured thereto by means of a pair of C-clamps 39, one at each end. This pattern is preferably made of wood, as a different one may have to be used where the legs have a different taper. It is of substantial thickness, and is so set that its inner longitudinal edge 38 lies parallel with the tapered surface of the leg.

The base 31 of the tool has an extended end 36, the tip of which is narrow and rounded, and as the tool is moved longitudinally, the operator will cause this narrow, rounded tip to engage and follow along the edge 38 of the pattern, thus at every point governing the depth of the groove cut by the bit.

Figure 7:
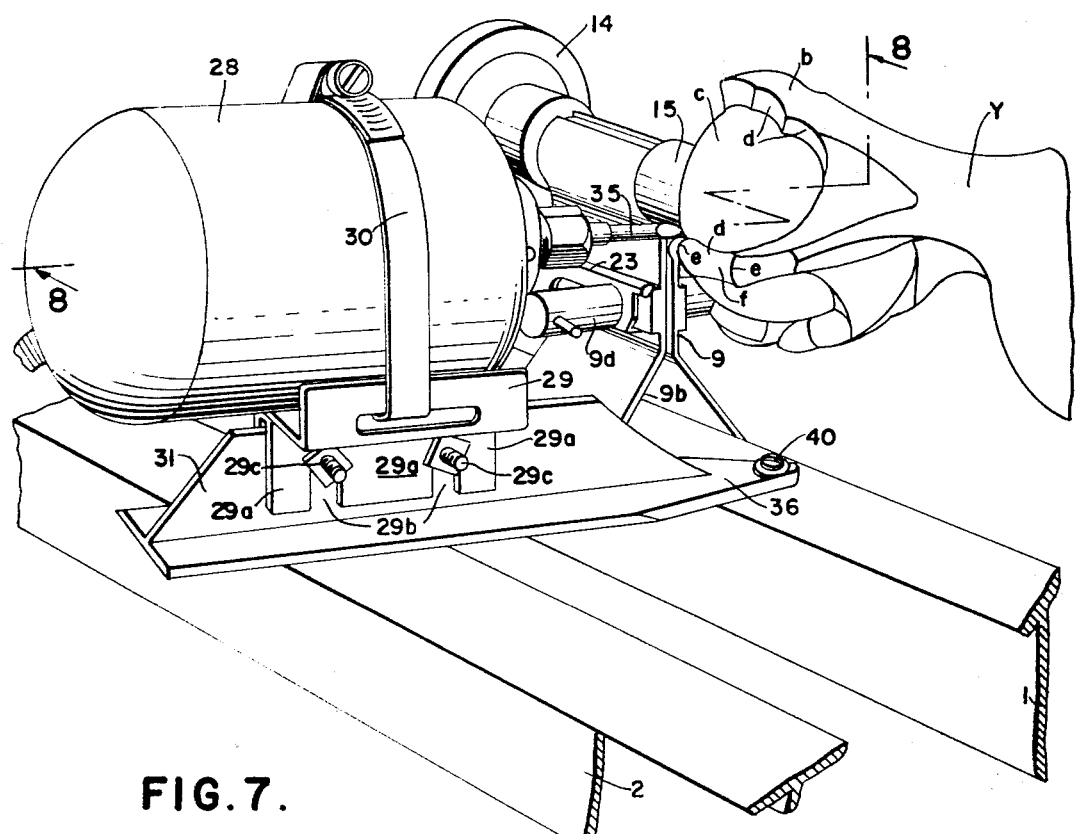
FIG. 7 is a perspective view on an enlarged scale somewhat similar to FIG. 4, but showing the equipment arranged to operate on a workpiece like that illustrated in FIG. 6.
Figure 8:
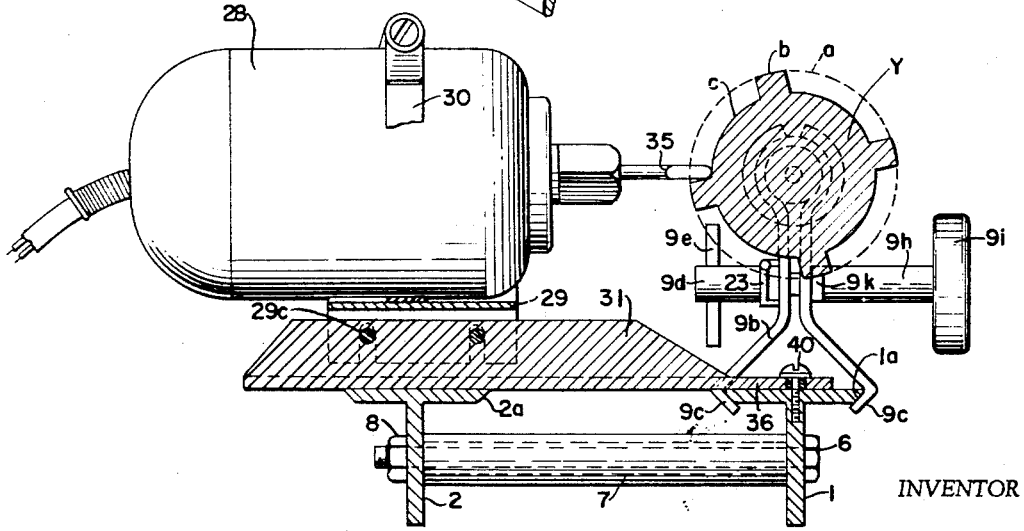
FIG. 8 is a vertical, transverse section through the partially finished workpiece shown in FIG. 7, and illustrating the power tool in position to operate on such workpiece.

Another type of work for which my novel equipment is applicable, is illustrated in FIGS. 6, 7 and 8. In these figures, I have illustrated a workpiece Y, in the nature of a furniture leg having a "ball and claw" foot which may be shaped by my equipment.

The furniture leg, having been roughed out into some such shape as shown in FIG. 6, but with the ball and claw formed in the shape of a sphere, as indicated by the dotted circle $a$ in FIG. 8, as by a lathe, is placed in position between the headstock and tailstock, as shown in FIG. 6. In using the equipment for shaping the ball and claw, the power tool or router, instead of being mounted to slide along the bars, is connected to the bar 1 by means of pivot 40, passing through the end of the extension 36 of the inverted T-member 31 of the base 29. In this instance, the sub-base 33 is not used, but the base member 31 rests directly on and is movable over the surface of the bars 1 and 2.

In positioning the workpiece in the holder, it must be set with the center of the sphere $a$ directly over the pivot 40. As the tool is swung about this pivot, as shown in FIG. 6, the end of the bit 35 moves in a horizontal arcuate path. By manually adjusting the angular position of the workpiece, while the bit is rotating, and the tool swung from side to side, portions of a ball may be formed, as indicated at $c$.

The operator will, of course, be careful to preserve the ribs $b$ (FIG. 8), from which the claws are to be formed. Owing to the fact that the bit 35 cuts at its sides as well as at its end, the sides of these ribs may be cut on curves, as indicated at $d$ (FIG. 7) to fashion the portions of the claws between the joints $e$. The concave and rounded outer surfaces $f$ of the portions of the claws between joints will be shaped and finished by means of suitable hand tools. It will thus be understood that the ball is formed and the claws roughed out, by my improved pivoted, power driven router, while the details and final shaping of the claws have to be done by hand.

Finally, in FIG. 9, I have illustrated a third way in which my improved work holder can be used. In this view, I have shown the bar 1 separated from the bar 2, and used alone. This bar 1 is equipped with headstock and tailstock, the same as in the previous figures. Held between the headstock and tailstock is a workpiece Z, to be shaped by means of suitable hand tools, such as draw knives, spoke shavers, scrapers, skivers, rasps, etc.

The workpiece may be turned to any desired angular position by manipulating the handwheel 14, as before, and frictionally held in any selected position by means of the headstock jaws gripping the shaft 11, as previously explained. This enables the craftsman to work on any part of the surface of the workpiece. And the mounting of the bar on the pivot 3 is especially advantageous in this case, since it enables the operator to tilt the workpiece to various angles in which the particular part of the surface being worked on is in the most accessible position.

It will thus be seen that my improved equipment is adaptable to many uses, either with or without the power driven tool, and it is thought that the numerous advantages of the invention will be readily appreciated by those familiar with the woodworking art.

What I claim is:

1. A work holder for wood-working tools comprising an elongated bar, a head stock and tail stock being constructed to engage the opposite ends of a workpiece, said tail stock having means for engaging said workpiece in the nature of a center about which the workpiece may rotate, and comprising a pair of jaws, the said center being formed at the end of a screw, the said jaws having means to engage the threads of said screw, and said center being rotatably held between said jaws, and means for clamping said jaws together.

2. A work holder for wood-working tools comprising an elongated bar, a head stock and tail stock mounted on said bar and adjustable there along toward and from each other, said head stock and tail stock each having at its outer end a workpiece supporting shaft, and each having a pair of jaws embracing said bar and shaft, and a single means for clamping each pair of said jaws together to cause them to frictionally grip said bar tightly enough to hold said head and tail stocks against longitudinal sliding movement therealong when desired.

3. A work holder in accordance with claim 2 in which the single clamping means consists of a screw extending transversely through said jaws at a point intermediate between said bar and shaft and serving to cause said jaws to grip both said bar and said shaft.

4. A wood-working tool and work holder comprising a frame made up of a pair of rigidly united, spaced, parallel horizontal bars each having a flat upper surface lying substantially in the same plane, means mounted on one of said bars for adjustably holding an elongated workpiece by its ends, and a power driven rotary tool unit supported on and movable over both surfaces.

5. A wood-working tool and work holder in accordance with claim 4 in which the power driven tool unit is mounted on a base pivoted at its end to the said bar which holds the workpiece, and swingable around this pivot in a horizontal plane while slidably supported on the upper surface of the other of said bars.

6. Equipment in accordance with claim 5, in which the end of the workpiece may be centered directly over the pivot of the power tool base, so that by swinging the tool base about this pivot, the tool is moved in an arcuate path, and by adjusting the workpiece to different angular positions around its axis while swinging the tool base about its pivot, the tool will produce a spherical surface on the end of the workpiece.

7. A wood-working tool and work holder comprising a frame made up of a pair of rigidly united, spaced, parallel horizontal bars each having a flat upper surface lying substantially in the same plane, means mounted on one of said bars for adjustably holding an elongated workpiece by its ends, and a power driven rotary tool unit having a base supported on said surfaces and movable both longitudinally thereof, and transversely thereof toward and from said workpiece.

8. A wood-working tool and work holder comprising a frame made up of a pair of rigidly united, spaced, parallel horizontal bars each having a flat upper surface lying substantially in the same plane, means mounted on one of said bars for adjustably holding an elongated workpiece by its ends, and a power driven rotary tool unit having a base movable toward and from said workpiece, and a plurality of interchangeable guide patterns any selected one of which may be detachably secured to the said bar supporting the workpiece, each of said guide patterns having an edge surface against which the base of said tool unit bears to control and determine the transverse movement of the tool unit relative to the workpiece.

9. A work holder comprising an elongated frame, a head stock and tail stock mounted on said frame and adjustable there along toward and from each other, and means by which said frame is pivotally supported at a point intermediate its ends to tilt in a vertical plane, said supporting means formed of a vertically extending pedestal having at its lower end a clamp constructed to detachably engage the edge of a table.

References Cited

UNITED STATES PATENTS

| | | | |
|---|---|---|---|
| 182,186 | 9/1876 | Grant | 90—87 X |
| 1,965,728 | 7/1934 | Tautz | 142—38 |
| 2,769,466 | 11/1956 | Brauneis | 142—7 |
| 3,332,458 | 7/1967 | Baldwin | 142—7 |
| 324,669 | 8/1885 | Donecker | 144—136 |
| 704,373 | 7/1902 | Rawson | 144—136 |
| 1,833,355 | 11/1931 | Dahms | 144—288 |
| 2,367,574 | 1/1945 | Gieleghem | 82—12 |
| 3,140,640 | 7/1964 | Egger | 77—34.7 |

FOREIGN PATENTS

| | | |
|---|---|---|
| 49,712 | 3/1889 | Germany. |
| 84,793 | 4/1920 | Switzerland. |

FRANCIS S. HUSAR, *Primary Examiner.*

U.S. Cl. X.R.

77—34.7